UNITED STATES PATENT OFFICE.

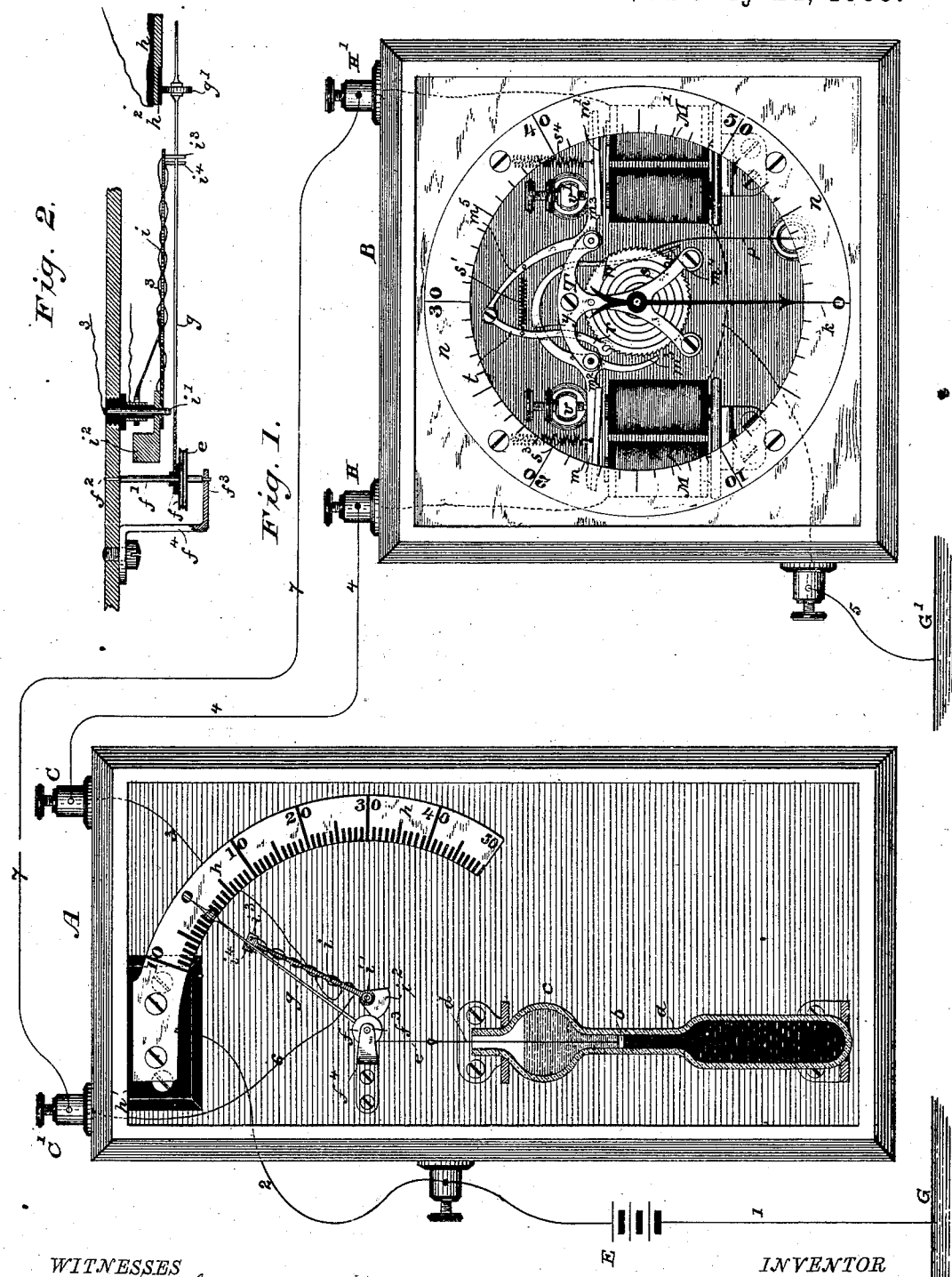

ROBERT HEWITT, JR., OF NEW YORK, N. Y.

ELECTRIC TEMPERATURE-INDICATOR.

SPECIFICATION forming part of Letters Patent No. 281,877, dated July 24, 1883.

Application filed October 24, 1882. (No model.)

*To all whom it may concern:*

Be it known that I, ROBERT HEWITT, Jr., a citizen of the United States, residing in the city, county, and State of New York, have invented certain new and useful Improvements in Electric Temperature-Indicators, of which the following is a specification.

The object of my invention is to provide a means of indicating with accuracy the temperature of a distant station at all times and the changes of such temperature as soon as they take place. It is therefore applicable to stations that are at times inaccessible—as high mountains—and to buildings or apartments required to be kept at certain temperatures—as refrigerators—and in such case the actual temperature existing in several different apartments may be constantly indicated at a central office.

My invention therefore consists of an electric-circuit controller which is placed at the station the temperature of which is to be indicated, and a corresponding indicator at the home station, which shows the condition and changes of temperature which cause the operation of the circuit-controller. These are connected by an electric conductor. The circuit-controller consists of a column of mercury contained in a glass tube bearing upon its surface a metallic float, preferably of platinum. The metallic float, by its rise and fall with the column of mercury as the temperature changes, causes an index or pointer to move over a graduated arc, thus indicating the degrees of expansion and contraction of the mercury. Connected with the index, and carried with it in its movement, is an electric-circuit closer, so arranged that a slight motion of said index in either direction upon the scale causes electrical currents to traverse the conductor and operate the indicating mechanism at the other or central station. The indicating mechanism consists of two electro-magnets with their armatures and armature-levers so connected that their motion is communicated to a pointer which sweeps over a graduated scale, as in the circuit-controller at the first station, one electro-magnet being so connected as to move the hand in one direction—say as the column of mercury in the circuit-controlling mechanism rises—and the other electro-magnet being so connected as to move the hand in the other direction, as the column of mercury falls.

In the accompanying drawings, which illustrate my invention, Figure 1 gives a view in elevation of both parts of the apparatus with the circuit-connections, A being the circuit-controller, which is placed at the station the temperature of which is required to be observed, and B the indicator at the central or observing station; and Fig. 2 is a sectional view of A, taken in the plane of the index or pointer.

The glass tube $a$ holds the column of mercury, upon which rests a platinum float, $b$, which moves up and down, according to the expansion or contraction of its supporting-column of mercury. Above the float $b$ the glass tube is expanded into the bulb $c$, which preferably contains a quantity of dilute sulphuric acid, the office of which is to prevent the contact of the air with the float and mercury. A fine wire, $d$, and cord $e$ are mechanically connected with the float, the cord passing over and connected with the small pulley $f$. (Best seen in Fig. 2.) This pulley $f$ is attached to the arbor $f'$, which moves with the least possible friction in its bearings $f^2$ and $f^3$— the former in the base-plate of the instrument, the latter in an arm or projection, $f^4$, screwed thereto. To the same arbor, $f'$, is attached the hand or index $g$, which reaches and sweeps over the face of the graduated arc $h$, and is in constant electrical contact therewith by means of the contact-wheel $g'$, which turns freely in its bearings and rolls across the graduated portions of the scale. The graduated arc $h$ is of metal, and is insulated from the frame of the instrument, being attached to and supported by the insulating-block $h'$. The indented lines, which form the graduations of the scale, are filled with suitable insulating material flush with the surface, as shown at $h^2$, Fig. 2. It will be understood, therefore, that as the float is pushed upward by the expansion of the column of mercury the cord $e$ is loosened, and the preponderant weight of the end of the arm $g$ will cause it to fall and wind the slackened cord around the pulley $f$. Near the bearings of the pulley $f$ and arm $g$ is pivoted a second arm, $i$, having its bearing in the base-plate of the instrument, turning on its arbor $i'$ with the least possible friction. The arm $i$ is counterbalanced by the weight $i^2$, and it carries two insulated wires, attached, respectively, to the contact-pins $i^3$ and $i^4$ at its outer end. The arm $g$ passes between these contact-pins, having a little space for free play. When, therefore, the arm $g$ moves in either direction, the arm $i$ is almost immediately taken and carried along with it.

The indicating mechanism at the home or central station consists of two electro-magnets, M and M', provided with armatures $m$ and $m'$, and a wheel, W, having a number of teeth or notches upon its periphery equal to the number of divisions upon the scale $h$. An index or hand, $k$, is affixed to the arbor of the wheel W and moves over the graduated circular dial $n$, having the same number of divisions as the scale $h$. The T-shaped standard T, projecting from the back plate of the instrument, furnishes bearing-supports for the wheel W and the armature-levers $m^2$ and $m^3$ of the electro-magnets M and M'. One end of a coiled spring, $s$, is attached to the standard T and its other end to the face of the wheel W, and by its tension tends to turn the latter, together with its attached hand or index $k$, to the left, or toward 10 on the scale; but the wheel and index are kept in check by the spring-pawl $p$, and also by the pallet $r$, which is attached to the arm $t$. The spiral spring $s'$ tends to keep the pallet $r$ engaged with one of the teeth of the wheel W. If, now, a current of electricity passes through the coils of the electro-magnet M, the armature $m$, which is normally held against the stop $v$ by the spring $s^3$, is attracted toward the poles of the magnet, and the lower left end of the curved armature-lever $m^2$, which forms a pallet, $m^3$, is carried downward, ready for engagement with a tooth of the wheel W. At the same time a pin, $y$, upon the upper part of the armature-lever $m^2$ raises the arm $t$ and its pallet $r$ out of engagement with the wheel W, while the other curved lower extension, $m^4$, of the armature-lever $m^2$ forces the spring-pawl $p$ also out of engagement with the wheel W. The latter, being thus released, is carried forward by the stress of the spring $s$ through a space equal to one tooth, and is then stopped by its engagement with the pallet $m^3$. When the current ceases the armature $m$ is drawn away from the poles of the electro-magnet M by the spring $s^3$ until arrested by the stop $v$, the spring $p$ and pallet $r$ fall into their normal places, and the wheel W is locked in its new position. Each to-and-fro movement of the armature $m$, therefore, allows the index $k$ to be carried forward over one division on the graduated dial $n$. If, now, a current of electricity passes through the other electro-magnet M', the armature $m'$ is attracted, the armature-lever $m^5$ and connecting-arm $t$ are raised, and the pallet $r$ is brought into engagement with the next upper tooth. When the current ceases the spring $s^4$ draws the armature up against the stop $v'$, the arm $t$ and pallet $r$ are pressed downward, turning the wheel W the space of one tooth in a reverse direction, and holding it there against the stress of the coiled spring $s$. Hence the two electro-magnets M and M', when excited, respectively cause the arm $k$ to move in opposite directions around the graduated circle $n$.

The operation of the apparatus is as follows: The arm $g$ being properly connected with the float $b$, so as to point to the mark 0, or zero, on the scale $h$, when that corresponds to the temperature of the column of mercury, then, with any expansion of the column and rise of the float $b$, the arm $g$ will fall and the wheel $g'$ will roll downward across the graduations of the scale $h$, first meeting with the contact-pin $i^3$, and then carrying along with it the arm $i$. The electric circuit is arranged in the following manner: The battery E has one of its poles connected by a wire, 1, with the earth at G, and the other with the binding-post P. Thence a wire, 2, leads to the graduated arc or scale $h$. From the scale the current passes by the contact-roller $g'$ to the arm $g$, and, the latter being otherwise insulated, it passes to one of the contact-pins $i^3$ or $i^4$. The method of connecting the two wires to the contact-pins $i^3$ and $i^4$ and of insulating them from each other is shown in Fig. 2. It is evident that if the contact-roller $g'$ rests upon one of the insulated portions of the scale $h$, or if the arm $g$ stands midway between the contact-pins $i^3$ and $i^4$, no current will pass; but as the arm $g$ moves downward it impinges upon the contact-pin $i^3$, and the circuit is completed through the wire 3 to the binding-post C, thence by wire 4 to binding-post H of the indicating-instrument B. It then passes through the coils of the electro-magnet M, after which it goes to the earth at G' by the wire 5. Therefore, as the contact-roller $g'$ advances over each successive division of the scale $h$, the circuit through the electro-magnet M is alternately opened and closed, and the hand $k$ of the indicator will advance in like manner over a corresponding number of divisions of the scale $n$. Should the mercury in the tube descend, then the weight of the float causes the pulley $f$ to turn, and with it the index $g'$, which thus sweeps upward, first meeting the contact-pin $i^4$, and then carrying upward along with it the arm $i$. As the index $g$ touches the contact-pin $i^4$ the electric circuit is made through the wire 6 to the binding-post C', and thence by wire 7 to the binding-post H' of the indicating-instrument, whence it goes through the coils of the electro-magnet M', and so by wire 5 to the earth at G'. Therefore, as the contact-roller $g'$ passes in a retrograde direction over each successive division of the scale $h$, the circuit through the electro-magnet M' is opened and closed, and the hand $k$ of the indicator will move over a corresponding number of divisions of the scale $n$ in the opposite direction, or toward zero.

The apparatus which I have described for actuating the movable arm and circuit-closer by the expansion and contraction of mercury constitutes a thermometer, and may be constructed in any well-known or convenient manner.

I claim as my invention—

1. The combination, substantially as hereinbefore set forth, of a thermometer, an electric generator, a contact-arm movable to and fro by the expansion and contraction of said thermometer, and a series of contacts electrically connected with each other and corresponding in number to the arbitrary divisions of the thermometric scale, with which contacts said arm is successively brought into electric connection through the agency of said thermometer.

2. The combination, substantially as hereinbefore set forth, of a thermometer, an electric generator, a contact-arm automatically movable to and fro by the expansion and contraction of said thermometer, a series of contacts corresponding in number to the arbitrary divisions of the thermometric scale, and a common conductor, to which all the said contacts are united.

3. The combination, substantially as hereinbefore set forth, of a thermometer, an electric generator, a contact-arm movable to and fro by the expansion and contraction of said thermometer, a series of contacts corresponding in number to the arbitrary divisions of the thermometric scale, a common conductor, to which all the said contacts are united, two movable contact-stops, upon one or the other of which the said contact-arm impinges, according to the direction of its movement, two main conductors respectively extending from said movable stops to an observing-station, an electro-magnet in each of said main conductors at said observing-station, and an index the movements of which in one direction or the other are controlled by the action of the respective electro-magnets.

4. The combination, substantially as hereinbefore set forth, of the insulated metallic arc, the graduated scale upon said arc, consisting of equidistant lines of insulating material, the index-hand movable in either direction along said arc, means for automatically actuating said index-hand, and the contact-arm actuated by said index-hand.

5. The combination, substantially as hereinbefore set forth, of an index-hand, a toothed wheel rigidly attached to the axis carrying said index-hand, a spring tending to move said index-hand in one direction, a pawl engaging with the successive teeth of said wheel, for holding it in any given position against the action of said spring, a movable pallet normally out of the path of the teeth of said wheel, an electro-magnet, and a lever which, when actuated by said electro-magnet, lifts said spring-pawl from one tooth to the wheel and simultaneously interposes said pallet in the path of a succeeding tooth, thereby permitting the wheel to revolve a distance equal to one tooth under the action of the spring.

In testimony whereof I have hereunto subscribed my name this 23d day of October, A. D. 1882.

ROBERT HEWITT, Jr.

Witnesses:
DANIEL W. EDGECOMB,
CHARLES A. TERRY.